(12) United States Patent
Gu

(10) Patent No.: US 9,864,265 B2
(45) Date of Patent: Jan. 9, 2018

(54) MULTI-PRISM MECHANISM FOR LASER EXPOSURE SYSTEM OF 3D IMAGES AND METHOD THEREOF

(71) Applicant: Jinchang Gu, Shanghai (CN)

(72) Inventor: Jinchang Gu, Shanghai (CN)

(73) Assignee: Shanghai Yiying Digital Technology Co., Ltd., Shanghai (CN)

( * ) Notice: Subject to any disclaimer, the term of this patent is extended or adjusted under 35 U.S.C. 154(b) by 173 days.

(21) Appl. No.: 14/413,988

(22) PCT Filed: Jul. 19, 2013

(86) PCT No.: PCT/CN2013/079654
§ 371 (c)(1),
(2) Date: Jan. 9, 2015

(87) PCT Pub. No.: WO2014/012513
PCT Pub. Date: Jan. 23, 2014

(65) Prior Publication Data
US 2015/0205192 A1 Jul. 23, 2015

(30) Foreign Application Priority Data

Jul. 20, 2012 (CN) .......................... 2012 1 0253319

(51) Int. Cl.
*G03B 27/42* (2006.01)
*H04N 1/04* (2006.01)
*G03B 27/16* (2006.01)
*G02B 26/10* (2006.01)
*G03B 27/54* (2006.01)

(52) U.S. Cl.
CPC ............. *G03B 27/16* (2013.01); *G02B 26/10* (2013.01); *G03B 27/54* (2013.01)

(58) Field of Classification Search
CPC ...... G02B 26/10; G02B 23/26; G02B 26/123; G02B 26/0841; G02B 21/002; G02B 21/0032; G02B 26/0816; G02B 26/108; G02B 26/125; G02B 27/104; G02B 27/2292; G02B 5/04; H04N 9/3129; H04N 9/3161; H04N 5/2256; H04N 9/3135; H04N 5/74; H04N 9/3155
See application file for complete search history.

(56) References Cited

U.S. PATENT DOCUMENTS 6,169,562 B1 * 1/2001 Morimoto .............. H04N 1/502
347/116

* cited by examiner

*Primary Examiner* — Mesfin Asfaw

(57) ABSTRACT

A multi-prism mechanism includes: an exposure motherboard; and a laser controlling and launching unit; wherein a multi-prism unit, a lens, an angle-switching reflecting mirror, a light detecting reflecting mirror, a light detecting device, three acousto-optical driving controllers, a laser driving control panel, a plurality of support posts and a plurality of reflecting mirrors are provided on the exposure motherboard; the laser controlling and launching unit is mounted on the support posts through nuts, in such a manner that the laser controlling and launching unit is installed on the exposure motherboard in a folded form; wherein the lens comprises a light inputting face and a light outputting face, the laser controlling and launching unit comprises three laser generator sets in parallel, the laser generator set comprises an acousto-optical regulator, a light valve, a directing lens, an optical zooming lens, a laser reflecting mirror and a spotting reflecting mirror.

6 Claims, 3 Drawing Sheets

MULTI-PRISM MECHANISM FOR LASER EXPOSURE SYSTEM OF 3D IMAGES AND METHOD THEREOF

CROSS REFERENCE OF RELATED APPLICATION

This is a U.S. National Stage under 35 U.S.C 371 of the International Application PCT/CN2013/079654, filed Jul. 19, 2013, which claims priority under 35 U.S.C. 119(a-d) to CN 201210253319.6, filed Jul. 20, 2012.

BACKGROUND OF THE PRESENT INVENTION

Field of Invention

The present invention relates to a laser exposure system and a method thereof, and more particularly to a multi-prism mechanism for a laser exposure system of 3D images and a method thereof.

Description of Related Arts

With gradual development of digital 3D imaging technology, 3D images have been widely accepted in image industry due to a more intuitive and realistic visual when being compared with two-dimensional images. 3D image processing equipment has evolved from an early-age with film as a display source, to a digital-age of projection imaging digital 3D processing equipment with convenient and reliable LCD as a display source. Although the conventional projection imaging digital 3D processing equipment with LCD display source is able to print small-size 3D photos, it is particularly urgent for developing large-size digital 3D printing equipments, so as to meet the needs of globe market for 3D photos with long visual distance and large size.

Conventionally, researchers in the world utilize rotating mirror and oscillating mirror as a laser rotating scanning imaging devices of large 3D imaging equipment. The rotating mirror has a good scanning imaging result. However, the price thereof is high, and the rotating mirror is easy to be damaged and must be imported. The price of the oscillating mirror is moderate, but the oscillating mirror also has to rely on import. Furthermore, with the oscillating mirror, swing angle of scanning imaging for printing large-size 3D image is limited, and a failure rate of the oscillating is higher than the failure rate of the rotating mirror. Therefore, it is particularly urgent for researching which laser scanning imaging device not only meets application requirements of large-size 3D images, but also is economic, stable and reliable, so as to adapt to moving scanning exposure engine of an exposure system of the digital 3D imaging.

SUMMARY OF THE PRESENT INVENTION

An object of the present invention is to overcome conventional technical deficiencies of lacking laser exposure systems for enlargement of digital 3D (three-dimensional) images, and provide a multi-prism mechanism for a laser exposure system of 3D images and a method thereof adaptable for a rotating scanning device of the laser exposure system for digital 3D image printing.

Accordingly, in order to accomplish the above object, the present invention provides a multi-prism mechanism for a laser exposure system of 3D images with a reasonable structure, stable performance and a reliable quality.

The multi-prism mechanism for a laser exposure system of three-dimensional images comprises:

an exposure motherboard; and a laser controlling and launching unit;

wherein a multi-prism unit, a lens, an angle-switching reflecting mirror, a light detecting reflecting mirror, a light detecting device, three acousto-optical driving controllers, a laser driving control panel, a plurality of support posts and a plurality of reflecting mirrors are provided on the exposure motherboard; the laser controlling and launching unit is mounted on the support posts through nuts, in such a manner that the laser controlling and launching unit is installed on the exposure motherboard in a folded form; wherein the lens comprises a light inputting face and a light outputting face, the laser controlling and launching unit comprises three laser generator sets in parallel, each of the laser generator sets comprises an acousto-optical regulator, a light valve, a directing lens, an optical zooming lens, a laser reflecting mirror and a spotting reflecting mirror;

wherein the acousto-optical regulators of the laser controlling and launching unit are correspondingly connected to the acousto-optical driving controllers, the acousto-optical driving controllers are connected to the laser driving control panel, and the laser driving control panel is connected to a computer.

The multi-prism unit is provided at a light inputting face side of the lens; the multi-prism unit comprises a multi-prism with a mirror, a lens cap, and a rotatable holder; wherein the multi-prism is mounted on the rotatable holder; the lens cap has a light inputting opening and a light outputting opening, the light inputting opening is provided towards a face of the angle-switching reflecting mirror, and the light outputting opening is provided towards a face of the lens; a center height of the mirror of the multi-prism equals to a horizontal central height of the lens.

The angle-switching reflecting mirror is provided at a light outputting face side of the lens, and a center height of the angle-switching reflecting mirror equals to a horizontal central height of the lens.

The light detecting device is connected to the laser driving control panel, the laser driving control panel is a controlling device capable of RGB color operation.

The light detecting reflecting mirror and the light detecting device are respectively mounted at two sides of the light outputting face side of the lens, and form a horn shape.

A first photo information is obtained from the computer by the laser driving control panel, and the first photo information is transformed and sent to the three acousto-optical driving controllers, so as to send corresponding orders to the acousto-optical regulators of the three laser generator sets, in such a manner that the corresponding acousto-optical regulators transform the first photo information into corresponding RGB color monochrome first laser beams. The first laser beams are reflected into the spotting reflecting mirror through the light valve, the directing lens, an optical zooming lens and the laser reflecting mirror, which means that the first laser beams are reflected for a first time, and a first reflecting angle is 90°. Because there are three laser generator sets in parallel, the first laser beams reflected into the spotting reflecting mirror by the laser reflecting mirror are the RGB first laser beams. The first laser beams are reflected to the angle-switching reflecting mirror by the spotting reflecting mirror, which means that the first laser beams are reflected for a second time, and a second reflecting angle is vertically downward. Then the first laser beams are reflected to the mirror of the multi-prism through the light inputting opening of the lens cap of the multi-prism unit by the angle-switching reflecting mirror, which means that the first laser beams are reflected for a third time, and a third reflecting angle is 30°. Meanwhile, the first laser beams are reflected by the mirror of the multi-prism which is driven to rotate by the rotatable holder, in such a manner that the first laser beams are reflected out through the light outputting opening of the lens, which means that the first laser beams are reflected for a fourth time, and a reflecting direction is parallel to the exposure motherboard, in such a manner that the first laser beams are reflected to the light detecting reflecting mirror and the reflecting mirror through the lens. When the light detecting reflecting mirror receives the first laser beams, the first laser beams are instantly reflected to the light detecting device. The first laser beams are transmitted to the laser driving control panel by the light detecting device, then transmitted to the computer by the laser driving control panel for determining a radiation width of the first laser beam before the computer feeds back information to the laser driving control panel. The laser driving control panel operates the information and then sends to the acousto-optical driving controllers. The information is sent to the acousto-optical regulators by the acousto-optical driving controllers, and is transformed into second laser beams before being sent out. The second laser beams are reflected step by step to the multi-prism by the laser controlling and launching unit, and then reflected to the reflecting mirror by the multi-prism. The reflecting mirror transforms the second laser beams obtained into first linear scanning lines, and reflects the first linear scanning lines to a photosensitive photographic paper through an optical grating for printing.

The present invention also provides a method of a multi-prism mechanism for a laser exposure system of three-dimensional images for digital three-dimensional image printing, comprising steps of:

S1) obtaining first photo information from a computer by a laser driving control panel, transforming the first photo information and sending to three acousto-optical driving controllers, so as to send corresponding orders to acousto-optical regulators of three laser generator sets, in such a manner that the corresponding acousto-optical regulators transform the first photo information into corresponding RGB color monochrome first laser beams; reflecting the first laser beams into a spotting reflecting mirror through a light valve, a directing lens, an optical zooming lens and a laser reflecting mirror, wherein because there are three laser generator sets in parallel, the first laser beams reflected into the spotting reflecting mirror by the laser reflecting mirror are the RGB first laser beams; reflecting the first laser beams to an angle-switching reflecting mirror by the spotting reflecting mirror, then reflecting the first laser beams to a multi-prism unit by the angle-switching reflecting mirror; reflecting the first laser beams to a mirror of a multi-prism through a light inputting opening of a lens cap of the multi-prism unit, and reflecting the first laser beams to a reflecting mirror and a light detecting reflecting mirror by the mirror through a light outputting opening of the lens cap and a lens, wherein because the multi-prism is mounted on a rotatable holder, the multi-prism rapidly rotates with the rotatable holder; therefore, light reflected by the multi-prism has a radiation range; as a result, when the first laser beams reach the light detecting reflecting mirror, instantly reflecting the first laser beams to a light detecting device by the light detecting reflecting mirror, transmitting information of the first laser beams obtained to the laser driving control panel by the light detecting device, transforming the first laser beams into first laser beam information and feeding back to the computer by the laser driving control panel, providing a laser beam section and a radiation width by the computer according to angle requirements of each image, feeding back information to the laser driving control panel, then transforming the information and sending to the acousto-optical driving controllers by the laser driving control panel, sending to the laser controlling and launching unit by the acousto-optical driving controllers, and step by step reflecting the first laser beams to the mirror of the multi-prism by the laser controlling and launching unit, then reflecting to the reflecting mirror by the multi-prism, transforming the first laser beams reflected by the multi-prism into first linear scanning lines by the reflecting mirror, and reflecting to a three-dimensional photosensitive material through an optical grating for first moving scanning exposure;

S2) obtaining deflecting angle data information of another photo relative to a previous photo and shifting data information of a photosensitive platform by the computer, and sending a deflecting order to the multi-prism and a shifting order to the photosensitive platform, wherein a shifting direction is within the radiation width, in such a manner that an angle of laser linear beams reflected by a prism face of the mirror of the multi-prism of the multi-prism unit and a position of the photosensitive platform in the step S2 are misplaced when being compared with states thereof in the step S1;

S3) obtaining a second photo information in the step S2 from the computer by the laser controlling and launching unit, launching second laser beams by a laser exposure system according to the second photo information, perpendicularly reflecting the second laser beams to the angle-switching reflecting mirror by the spotting reflecting mirror of the laser controlling and launching unit, then reflecting to the prism face of the mirror of the multi-prism of the multi-prism unit by the angle-switching reflecting mirror, reflecting the second laser beams to the reflecting mirror by the prism face of the mirror through the lens for forming second scanning lines, and reflecting to the three-dimensional photosensitive material through the optical grating for second moving scanning exposure; and S4) repeating the step S2 and the step S3, until moving scanning exposure of all images is finished.

Before the step S1, the method further comprises a step of: combining the photosensitive photographic paper with the optical grating, wherein due to different requirements such as three-dimensional strength, sight and utilization situation for digital 3D photos to be enlarged, resolutions and thicknesses of optical grating photographic papers utilized and enlargement methods are different. The method is suitable for optical grating photographic papers with a smaller resolution which is easier to be curled if thinner. The optical grating photographic paper is formed by combining a photosensitive material with an optical grating or directly applying a photosensitizer to a back of an optical grating which is thin and easy to be curled.

After the step S4, the method further comprises a step of: combining the photosensitive photographic paper with the optical grating for forming a 3D image; wherein the step is particularly suitable for 3D photos requiring long visual and high 3D strength. Because an optical grating photographic paper utilized by the 3D image requires a high resolution and a thick optical grating which cannot be curled, the optical grating must be firmly pressed against the photosensitive paper, and then the reflecting mirror reflects to the optical grating photosensitive paper pressed against the photosensitive platform. After a latent image is formed, the optical grating is automatically separated from the photographic paper. Then the photographic paper is sent into a relevant area for being washed and dried, and the washed and dried photographic paper is combined with the optical grating.

According to the present invention, by freely combining the preferred conditions based on general knowledge in the art, preferred embodiments of the present invention are able to be obtained.

Advantages of the present invention are: the multi-prism mechanism for the laser exposure system of the three-dimensional images utilizes the multi-prism as a key core device of the laser scanning exposure system. The present invention not only fills a blank of the multi-prism utilized by the conventional laser three-dimensional imaging technology as a laser scanning imaging exposure system, but also meets a requirement of large size of digital three-dimensional images. Meanwhile, the present invention also meets enjoying requirements of people for the digital 3D images.

Figure 1:
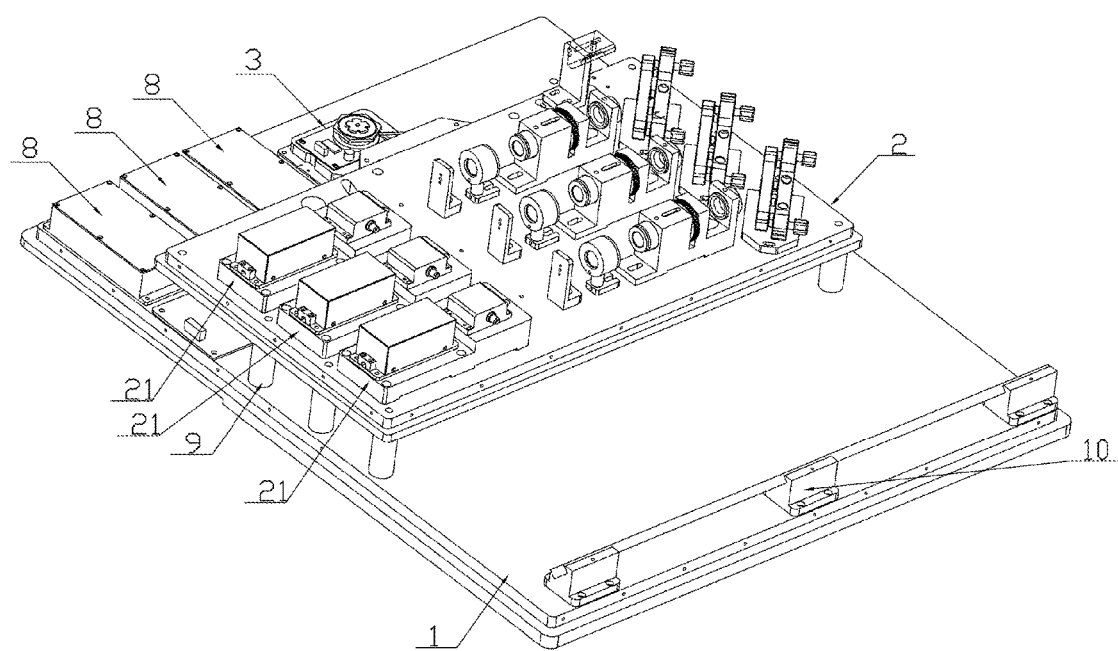
FIG. 1 is a perspective view of the present invention.

Element reference: 1-exposure motherboard; 2-laser controlling and launching unit; 3-multi-prism unit; 4-lens; 5-angle-switching reflecting mirror; 6-light detecting reflecting mirror; 7-light detecting device; 8-acousto-optical driving controller; 9-support post; 10-reflecting mirror; 11-laser driving control panel; 21-laser generator set; 211-laser generator; 212-acousto-optical regulator; 213-light valve; 217-directing lens; 214-optical zooming lens; 215-laser reflecting mirror; 216-spotting reflecting mirror; 31-multi-prism; 32-rotatable holder; 33-lens cap; 331-light inputting opening; 332-light outputting opening.

DETAILED DESCRIPTION OF THE PREFERRED EMBODIMENT

Referring to the drawings, the present invention according to a preferred embodiment is illustrated.

Figure 2:
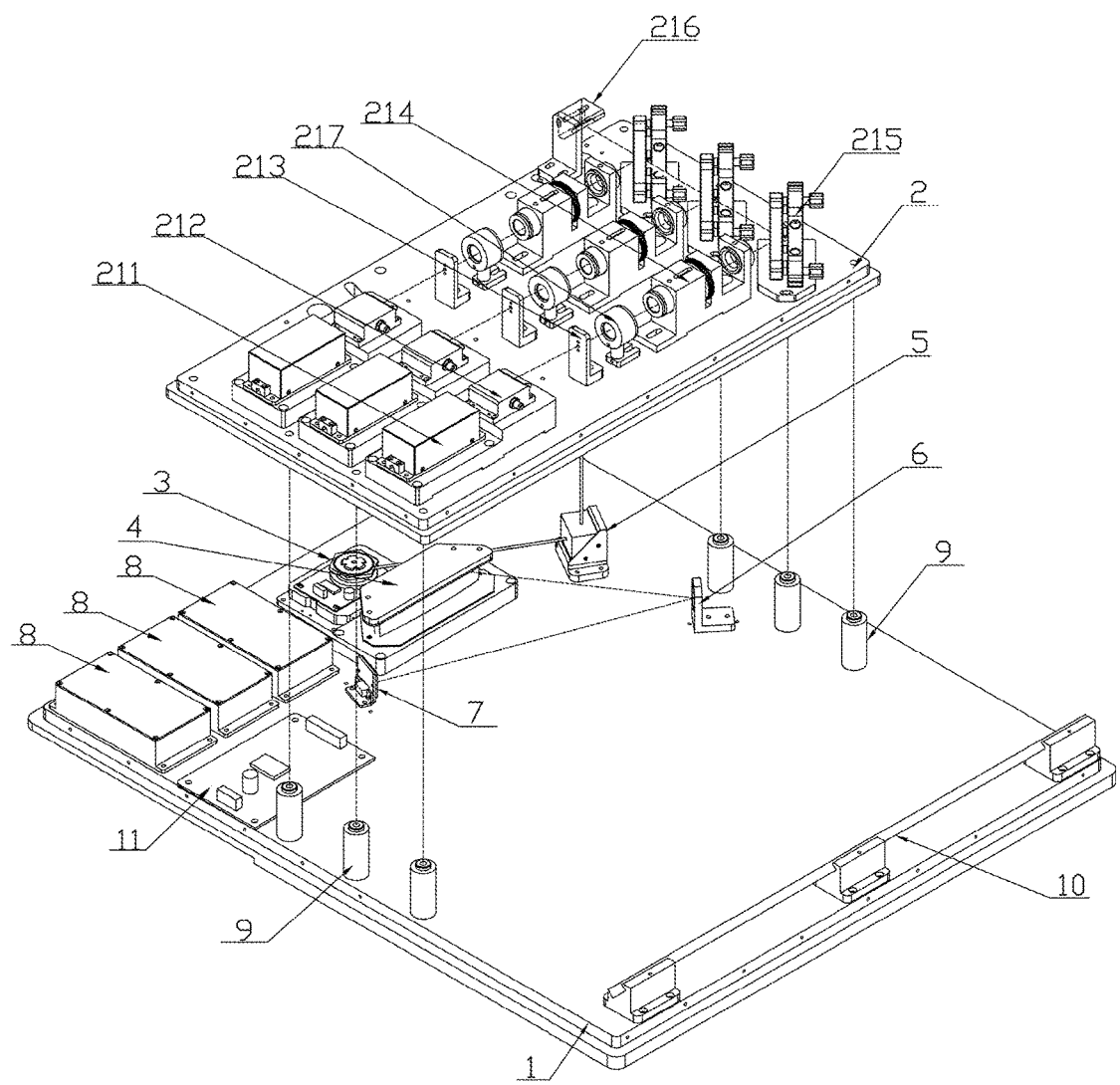
FIG. 2 is a perspective view of a multi-prism unit of the present invention.
Figure 3:
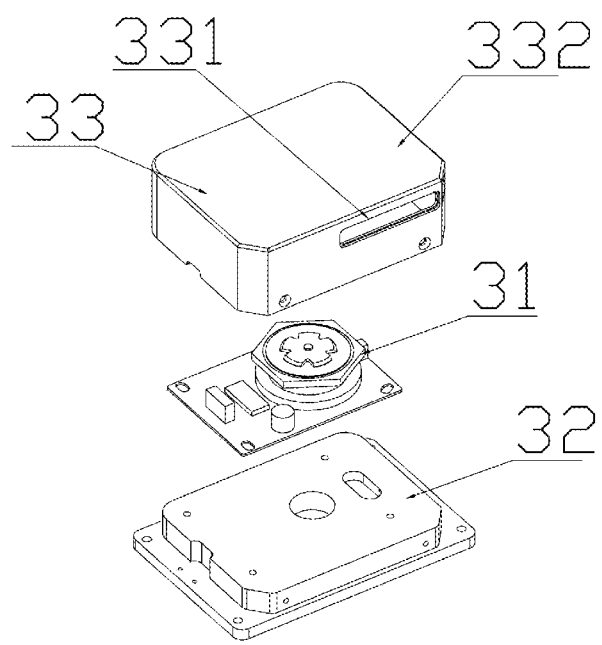
FIG. 3 is an exploded view of the multi-prism unit of the present invention.

Referring to the FIGS. 1-3, a multi-prism mechanism for a laser exposure system of three-dimensional image devices comprises:

an exposure motherboard 1; and
a laser controlling and launching unit 2;
wherein a multi-prism unit 3, a lens 4, an angle-switching reflecting mirror 5, a light detecting reflecting mirror 6, a light detecting device 7, three acousto-optical driving controllers 8, a laser driving control panel 11, a plurality of support posts 9 and a plurality of reflecting mirrors 10 are provided on the exposure motherboard 1; the laser controlling and launching unit 2 is mounted on the support posts 9 through nuts, in such a manner that the laser controlling and launching unit 2 is installed on the exposure motherboard 1 in a folded form; wherein the lens 4 comprises a light inputting face and a light outputting face, the laser controlling and launching unit 2 comprises three laser generator sets 21 in parallel, each of the laser generator sets 21 comprises a laser generator 211, an acousto-optical regulator 212, a light valve 213, a directing lens 217, an optical zooming lens 214, a laser reflecting mirror 215 and a spotting reflecting mirror 216;

wherein the acousto-optical regulators 212 of the laser controlling and launching unit 2 are correspondingly connected to one of the acousto-optical driving controllers 8, the acousto-optical driving controllers 8 are connected to the laser driving control panel 11, and the laser driving control panel 11 is connected to a computer.

The multi-prism unit 3 is provided at a light inputting face side of the lens 4; the multi-prism unit 3 comprises a multi-prism 31 with a mirror, a lens cap 33, and a rotatable holder 32; wherein the multi-prism 31 is mounted on the rotatable holder 32; the lens cap 33 has a light inputting opening 331 and a light outputting opening 332, the light inputting opening 331 is provided towards a face of the angle-switching reflecting mirror 5, and the light outputting opening 332 is provided towards a face of the lens 4; a center height of the mirror of the multi-prism 31 equals to a central height of the lens 4.

The angle-switching reflecting mirror 5 is provided at a light outputting face side of the lens 4, and a center height of the angle-switching reflecting mirror 5 equals to a central height of the lens 4.

The light detecting device 7 is connected to the laser driving control panel 11, the laser driving control panel 11 is a controlling device capable of RGB color operation.

The light detecting reflecting mirror 6 and the light detecting device 7 are respectively mounted at two sides of a light outputting face side of said lens, and form a horn shape.

The present invention also provides a method of a multi-prism mechanism for a three-dimensional image laser exposure system of three-dimensional images for digital three-dimensional image enlargement, comprising steps of:

S1) obtaining first photo information from a computer by a laser driving control panel 11, transforming the first photo information and sending to three acousto-optical driving controllers 8, so as to send corresponding orders to acousto-optical regulators 212 of three laser generator sets 21, in such a manner that the corresponding acousto-optical regulators 212 transform the first photo information into corresponding RGB color monochrome first laser beams; reflecting the first laser beams into a spotting reflecting mirror 216 through a light valve 213, a directing lens 217, an optical zooming lens 214 and a laser reflecting mirror 215, wherein because there are three laser generator sets 21 in parallel, the first laser beams reflected into the spotting reflecting mirror 216 by the laser reflecting mirror 215 are the RGB first laser beams; reflecting the first laser beams to an angle-switching reflecting mirror 5 by the spotting reflecting mirror 216, then reflecting the first laser beams to a multi-prism unit 3 by the angle-switching reflecting mirror 5; reflecting the first laser beams to a mirror of a multi-prism 31 through a light inputting opening 331 of a lens cap 33 of the multi-prism unit 3, and reflecting the first laser beams to a light detecting reflecting mirror 6 and a reflecting mirror 10 by the mirror through a light outputting opening 332 of the lens cap 33 and a lens 4, wherein because the multi-prism 31 is mounted on a rotatable holder 32, the multi-prism 31 rotates with the rotatable holder 32; therefore, light reflected by the multi-prism 31 has a radiation range; as a result, when the first laser beams reach the light detecting reflecting mirror 6, instantly reflecting the first laser beams to a light detecting device 7 by the light detecting reflecting mirror 6, transmitting information of the first laser beams obtained to the laser driving control panel 11 by the light detecting device 7, transforming the first laser beams into first laser beam information and feeding back to the computer by the laser driving control panel 11, providing a laser beam section and a radiation width by the computer, after the radiation width is determined, feeding back information to the laser driving control panel 11 by the computer, then transforming the information and sending to the acousto-optical driving controllers 8 by the laser driving control panel 11, sending to the laser controlling and launching unit 2 by the acousto-optical driving controllers 8, and step by step reflecting the first laser beams to the mirror of the multi-prism 31 by the laser controlling and launching unit 2, then reflecting to the reflecting mirror 10 by the multi-prism 31, transforming the first laser beams reflected by the multi-prism 31 into first linear scanning lines by the reflecting mirror 10, and reflecting to a photosensitive photographic paper through an optical grating for first scanning exposure;

S2) obtaining deflecting angle data information of another photo relative to a previous photo and shifting data information of a photosensitive platform by the computer, and sending a deflecting order to the multi-prism 31 and a shifting order to the photosensitive platform, wherein a shifting direction is within the radiation width, in such a manner that an angle of laser linear beams reflected by a prism face of the mirror of the multi-prism 31 of the multi-prism unit 3 and a position of the photosensitive platform in the step S2 are misplaced when being compared with states thereof in the step S1;

S3) obtaining a second photo information in the step S2 from the computer by the laser controlling and launching unit 2, launching second laser beams by a laser exposure system according to the second photo information, perpendicularly reflecting the second laser beams to the angle-switching reflecting mirror 5 by the spotting reflecting mirror 216 of the laser controlling and launching unit 2, then reflecting to the prism face of the mirror of the multi-prism 31 of the multi-prism unit 3 by the angle-switching reflecting mirror 5, reflecting the second laser beams to the reflecting mirror 10 by the prism face of the mirror through the lens 4 for forming second scanning lines, and reflecting to the three-dimensional photosensitive photographic paper through the optical grating for second moving scanning exposure; and S4) repeating the step S2 and the step S3, until moving scanning exposure of all images is finished.

Before the step S1, the method further comprises a step of: combining the photosensitive photographic paper with the optical grating, wherein due to different requirements such as three-dimensional strength, sight and utilization situation for digital 3D photos to be enlarged, resolutions and thicknesses of optical grating photographic papers utilized and enlargement methods are different. The method is suitable for optical grating photographic papers with a smaller resolution which is easier to be curled if thinner. The optical grating photographic paper is formed by combining a photosensitive material with an optical grating or directly applying a photosensitizer to a back of an optical grating which is thin and easy to be curled.

After the step S4, the method further comprises a step of: combining the photosensitive photographic paper with the optical grating for forming a 3D image; wherein the step is particularly suitable for 3D photos requiring long visual and high 3D strength. Because an optical grating photographic paper utilized by the 3D image requires a high resolution and a thick optical grating which cannot be curled, the optical grating must be firmly pressed against the photosensitive paper, and then the reflecting mirror 10 reflects to the optical grating photosensitive paper pressed against the photosensitive platform. After a latent image is formed, the optical grating is automatically separated from the photographic paper. Then the photographic paper is sent into a relevant area for being washed and dried, and the washed and dried photographic paper is combined with the optical grating.

One skilled in the art will understand that the embodiment of the present invention as shown in the drawings and described above is exemplary only and not intended to be limiting. It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A multi-prism mechanism for a laser exposure system of three-dimensional images, comprising:
    an exposure motherboard; and
    a laser controlling and launching unit;
    wherein a multi-prism unit, a lens, an angle-switching reflecting mirror, a light detecting reflecting mirror, a light detecting device, three acousto-optical driving controllers, a laser driving control panel, a plurality of support posts and a plurality of reflecting mirrors are provided on said exposure motherboard; said laser controlling and launching unit is mounted on said support posts through nuts, in such a manner that said laser controlling and launching unit is installed on said exposure motherboard in a folded form; wherein said lens comprises a light inputting face and a light outputting face, said laser controlling and launching unit comprises three laser generator sets in parallel, each of said laser generator sets comprises an acousto-optical regulator, a light valve, a directing lens, an optical zooming lens, a laser reflecting mirror and a spotting reflecting mirror;
    wherein said acousto-optical regulators of said laser controlling and launching unit are correspondingly connected to one of said acousto-optical driving controllers, said acousto-optical driving controllers are connected to said laser driving control panel, and said laser driving control panel is connected to a computer.

2. The multi-prism mechanism, as recited in claim 1, wherein said multi-prism unit is provided at a light inputting face side of said lens; said multi-prism unit comprises a multi-prism with a mirror, a lens cap, and a rotatable holder; wherein said multi-prism is mounted on said rotatable holder; said lens cap has a light inputting opening and a light outputting opening, said light inputting opening is provided towards a face of said angle-switching reflecting mirror, and said light outputting opening is provided towards a face of said lens; a center height of said mirror of said multi-prism equals to a horizontal central height of said lens.

3. The multi-prism mechanism, as recited in claim 1, wherein said angle-switching reflecting mirror is provided at a light outputting face side of said lens, and a center height of said angle-switching reflecting mirror equals to a horizontal central height of said lens.

4. The multi-prism mechanism, as recited in claim 1, wherein said light detecting device is connected to said laser driving control panel, said laser driving control panel is a controlling device capable of RGB color operation.

5. The multi-prism mechanism, as recited in claim 1, wherein said light detecting reflecting mirror and said light detecting device are respectively mounted at two sides of a light outputting face side of said lens, and form a horn shape.

6. A method of a multi-prism mechanism for a laser exposure system of three-dimensional images for digital three-dimensional image printing, comprising steps of:

S1) obtaining first photo information from a computer by a laser driving control panel, transforming the first photo information and sending to three acousto-optical driving controllers, so as to send corresponding orders to acousto-optical regulators of three laser generator sets, in such a manner that the corresponding acousto-optical regulators transform the first photo information into corresponding RGB color monochrome first laser beams; reflecting the first laser beams into a spotting reflecting mirror through a light valve, a directing lens, an optical zooming lens and a laser reflecting mirror, wherein because there are three laser generator sets in parallel, the first laser beams reflected into the spotting reflecting mirror by the laser reflecting mirror are the RGB first laser beams; reflecting the first laser beams to an angle-switching reflecting mirror by the spotting reflecting mirror, then reflecting the first laser beams to a multi-prism unit by the angle-switching reflecting mirror; reflecting the first laser beams to a mirror of a multi-prism through a light inputting opening of a lens cap of the multi-prism unit, and reflecting the first laser beams to a reflecting mirror and a light detecting reflecting mirror by the mirror through a light outputting opening of the lens cap and a lens, wherein because the multi-prism is mounted on a rotatable holder, the multi-prism rapidly rotates with the rotatable holder; therefore, light reflected by the multi-prism has a radiation range; as a result, when the first laser beams reach the light detecting reflecting mirror, instantly reflecting the first laser beams to a light detecting device by the light detecting reflecting mirror, transmitting information of the first laser beams obtained to the laser driving control panel by the light detecting device, transforming the first laser beams into first laser beam information and feeding back to the computer by the laser driving control panel, providing a laser beam section and a radiation width by the computer according to angle requirements of each image, feeding back information to the laser driving control panel, then transforming the information and sending to the acousto-optical driving controllers by the laser driving control panel, sending to the laser controlling and launching unit by the acousto-optical driving controllers, and step by step reflecting the first laser beams to the mirror of the multi-prism by the laser controlling and launching unit, then reflecting to the reflecting mirror by the multi-prism, transforming the first laser beams reflected by the multi-prism into first linear scanning lines by the reflecting mirror, and reflecting to a three-dimensional photosensitive material through an optical grating for first moving scanning exposure;

S2) obtaining deflecting angle data information of another photo relative to a previous photo and shifting data information of a photosensitive platform by the computer, and sending a deflecting order to the multi-prism and a shifting order to the photosensitive platform, wherein a shifting direction is within the radiation width, in such a manner that an angle of laser linear beams reflected by a prism face of the mirror of the multi-prism of the multi-prism unit and a position of the photosensitive platform in the step S2 are misplaced when being compared with states thereof in the step S1;

S3) obtaining a second photo information in the step S2 from the computer by the laser controlling and launching unit, launching second laser beams by a laser exposure system according to the second photo information, perpendicularly reflecting the second laser beams to the angle-switching reflecting mirror by the spotting reflecting mirror of the laser controlling and launching unit, then reflecting to the prism face of the mirror of the multi-prism of the multi-prism unit by the angle-switching reflecting mirror, reflecting the second laser beams to the reflecting mirror by the prism face of the mirror through the lens for forming second scanning lines, and reflecting to the three-dimensional photosensitive material through the optical grating for second moving scanning exposure; and S4) repeating the step S2 and the step S3, until moving scanning exposure of all images is finished.

\* \* \* \* \*